United States Patent
Baker et al.

(10) Patent No.: US 6,471,001 B1
(45) Date of Patent: Oct. 29, 2002

(54) ESCAPE SLIDE

(75) Inventors: Jeffrey A. Baker, Phoenix, AZ (US); Leibert K. Danielson, Phoenix, AZ (US)

(73) Assignee: The B.F. Goodrich Corporation, Charlotte, NC (US)

( * ) Notice: Subject to any disclaimer, the term of this patent is extended or adjusted under 35 U.S.C. 154(b) by 0 days.

(21) Appl. No.: 09/413,838

(22) Filed: Oct. 6, 1999

(51) Int. Cl.[7] ................................................ B64D 25/00
(52) U.S. Cl. ..................................... 182/48; 244/137 P
(58) Field of Search ........................ 182/48; 244/137 P (56) References Cited

U.S. PATENT DOCUMENTS

| | | | |
|---|---|---|---|
| 3,473,641 A | * | 10/1969 | Fisher |
| 3,692,144 A | * | 9/1972 | Summer ..................... 182/48 |
| 3,771,749 A | * | 11/1973 | Smialowicz ................ 182/48 |
| 3,819,011 A | * | 6/1974 | Kinase ........................ 182/48 |
| 3,829,353 A | * | 8/1974 | Fisher ......................... 182/48 |
| 3,973,645 A | * | 8/1976 | Dix ............................. 182/48 |
| 4,018,321 A | | 4/1977 | Fisher |
| 4,333,546 A | * | 6/1982 | Fisher |
| 4,434,870 A | | 3/1984 | Fisher |
| 4,487,411 A | * | 12/1984 | Ahrens |
| 4,684,079 A | | 8/1987 | Miller et al. |
| 4,846,422 A | * | 7/1989 | Fisher ......................... 182/48 |
| 5,150,765 A | | 9/1992 | Chen |
| 5,975,467 A | * | 11/1999 | O'Donnell et al. |

FOREIGN PATENT DOCUMENTS

| WO | PCT/SE93/00325 | 4/1993 |
|---|---|---|

* cited by examiner

*Primary Examiner*—Alvin Chin-Shue
(74) *Attorney, Agent, or Firm*—Jerry J. Holden (57) ABSTRACT

An aircraft life raft assembly for use as a deployable escape slide from an egress opening of an aircraft. The escape slide is a longitudinally extending structure with a center line that extends from the head end of the slide, adjacent the egress opening, to a toe end that is located adjacent the horizontally extending ground plane. Pressurizing means is operative to inflate the escape slide, which escape slide has panels or panel members of flexible material with an upper sliding surface that extends in the longitudinal direction. The escape slide has a portion of its length that is curvilinear in plan view, which curvilinear portion maybe close to the egress opening of the aircraft or anywhere along the length of the escape slide.

19 Claims, 6 Drawing Sheets

ESCAPE SLIDE

FIELD OF THE INVENTION

This invention relates to an inflatable life raft escape slide for aircraft and more particularly to a new and improved escape slide for use in evacuating passengers from especially high exits as well as those portions of an aircraft that have external obstructions.

BACKGROUND OF THE INVENTION

In normal structures of an aircraft, it has been satisfactory to provide a plurality of deployable escape slides from the various exits with slides providing a straight line path from the aircraft's doors and egress openings to the ground level. These inflatable straight line escape slides in larger aircraft often dictated the location of the egress doors and exits on the aircraft design even though it would be more desirable to provide an exit opening at another location but because of an external obstruction the exit had to be relocated. In some instances it was found necessary and desirable to connect the door's exit with an inflatable walkway onto a wing of an aircraft. Then, these walkways would be connected to an inflatable slide that extended to the ground surface.

In other instances a porch type structure is used as part of the inflatable slide that is situated adjacent to the aircraft body. The porch inflatable portion of the slide, which is horizontal, provides a turn in direction from the exit door to that portion of the inflatable slide that evacuates the passengers away from the aircraft.

The present invention is directed to a structural design of an inflatable escape slide that accommodates the location of the egress door and openings as needed by design even where there are external obstructions by the use of an inflatable escape slide that has a curvilinear portion, which curvilinear portion may be located near the egress door or further along the escape slide. It is the curvilinear portion that avoids the design obstructions such as wing configurations and nacelles for aircraft engines. In addition the escape slide of the present invention utilizes a double septum chambered construction which permits its use on aircraft structures that require slides of greater overall length since aircraft are larger in construction, height, width and accommodations. The double septum chambers provide greater strength with greater resistance to deformation forces. By use of the present invention, the cumbersome structure of the inflatable porch is eliminated thereby eliminating the significant weight and bulk to the inflatable slide that the porch added to the slide structure.

SUMMARY OF THE INVENTION

An aircraft inflatable life raft escape slide for use from an elevated structure such as an aircraft where such inflatable escape slide is deployable from an egress opening having its head end at such elevated openings and a toe end, upon deployment, located adjacent the ground level. The escape slide has an upper sliding surface with a longitudinally extending center line and with a portion of such escape slide being curvilinear in plan view to facilitate its deployment where there are obstructions such as the wing portions of an aircraft and its engine nacelles. This structure permits the aircraft design to accommodate the proper spacing of escape slides along it entire length. In addition, the escape slide has the curvilinear portion skewed to enhance the safe movement along the slides's length at the curvilinear portion as there is a change in directional movement of the evacuee, otherwise there is a continual movement in the same direction by the law of physics. This structure is thus extremely useful in view of the fact that aircraft structures have become increasingly larger and it is necessary to take into consideration the increased speeds that occur in evacuating passengers from these increased elevated structures. The escape slide is also provided with a double septum chamber structure to increase its resistance to deformation under load and adverse weather conditions.

DETAILED DESCRIPTION

Figure 1:
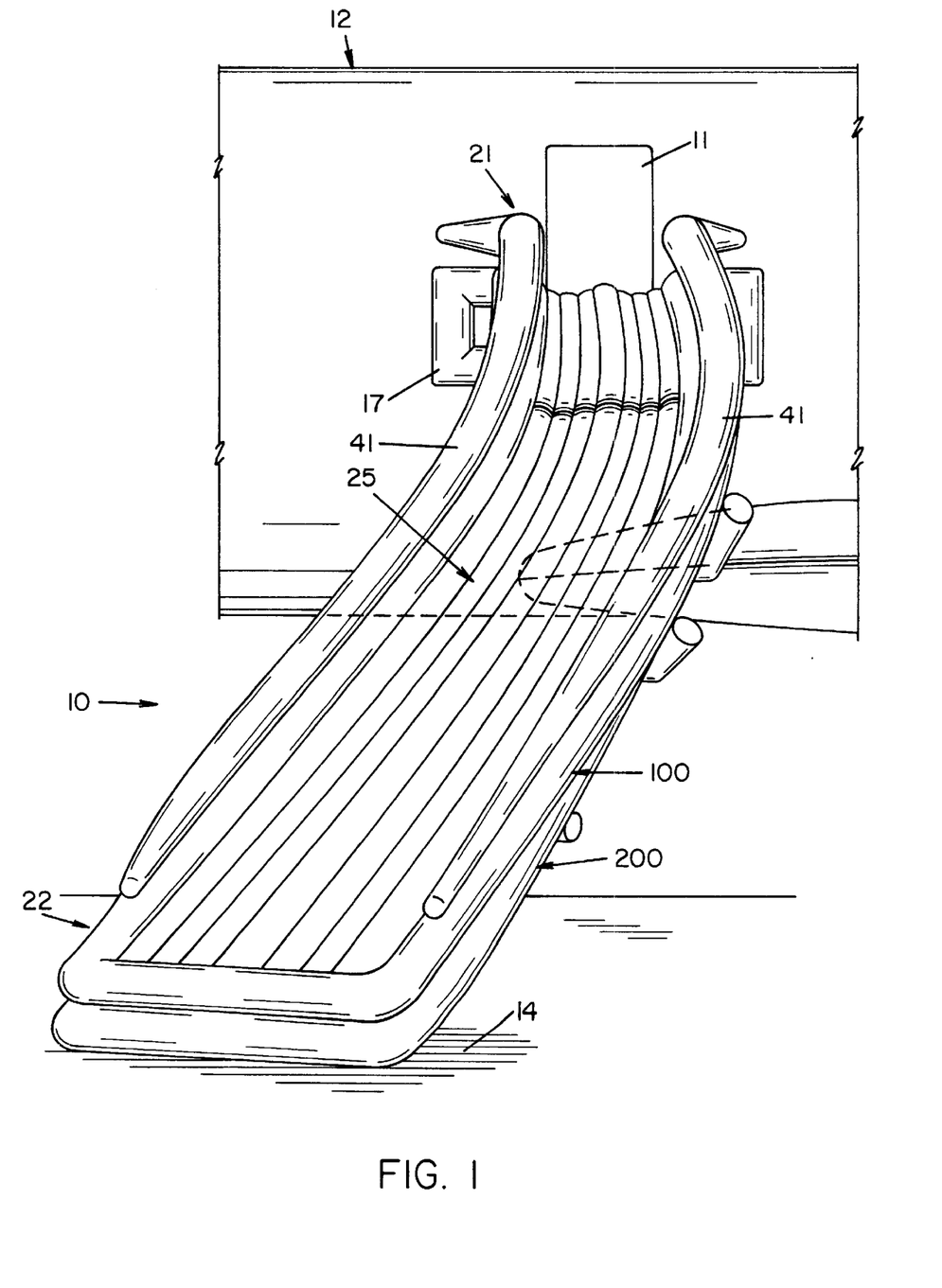
FIG. 1 is a perspective view of an inflatable escape slide extending from an aircraft fuselage to the ground.
Figure 2:
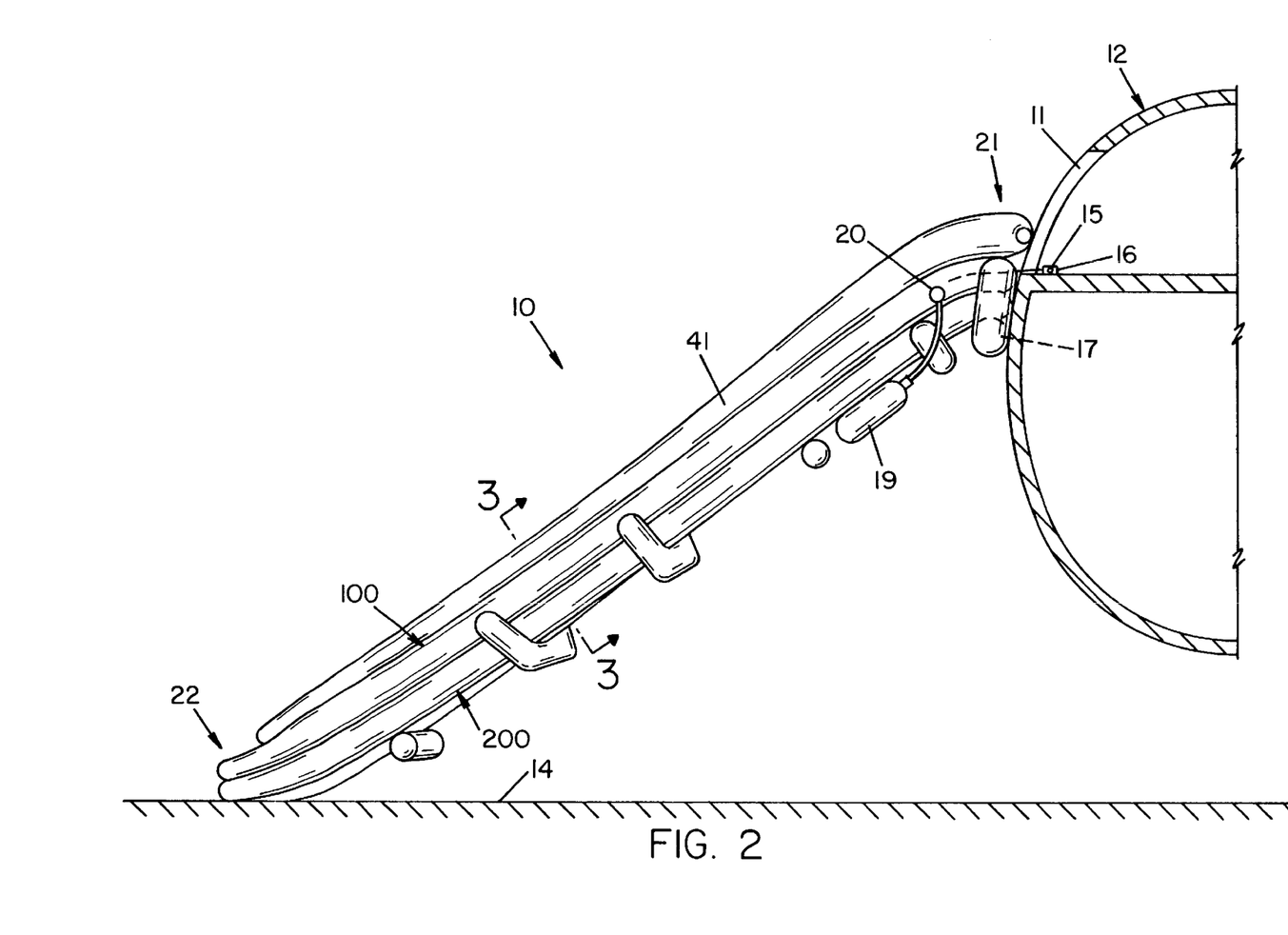
FIG. 2 is a side elevational view of the inflatable escape slide extending from an egress door of an aircraft's fuselage to a ground level.

Referring now to the drawings, wherein like reference characters designate like or corresponding parts throughout the several views, there is shown in FIGS. 1 and 2 an inflatable life raft escape slide 10 deployed from an egress door 11 of an aircraft fuselage 12 to the surface of the ground 14 so that passengers may safely slide down the slide 10 from the aircraft to the ground 14. The escape slide 10 is releasably fastened to the fuselage 12 by a girt bar 15 that is located adjacent to the egress door 11, which girt bar 15 is secured to spaced brackets 16 in a manner old and well known in the art. A positioning tube 17, which is connected to the escape slide 10 is located between the slide 10 and the fuselage 12 to aid in the positive positioning of the escape slide during deployment. The inflation system includes a source of high pressure fluid as container 19 which is suitably secured to the escape slide and upon actuation delivers pressurized fluids to an aspirator 20 or aspirators for pressurizing the escape slide 10 and the positioning tube 17.

The escape slide 10 has a head end 21 and a toe end 22. The entire escape slide 10 is fabricated from a fabric of suitable material and coated with an elastomer. The various parts of the escape slide 10 are joined together with a suitable adhesive whereby the composite structure to be described will permit air flow to the various internal chambers via suitable passageways but will preclude the air flow externally from the various chambers in the inflated condition.

Figure 3:
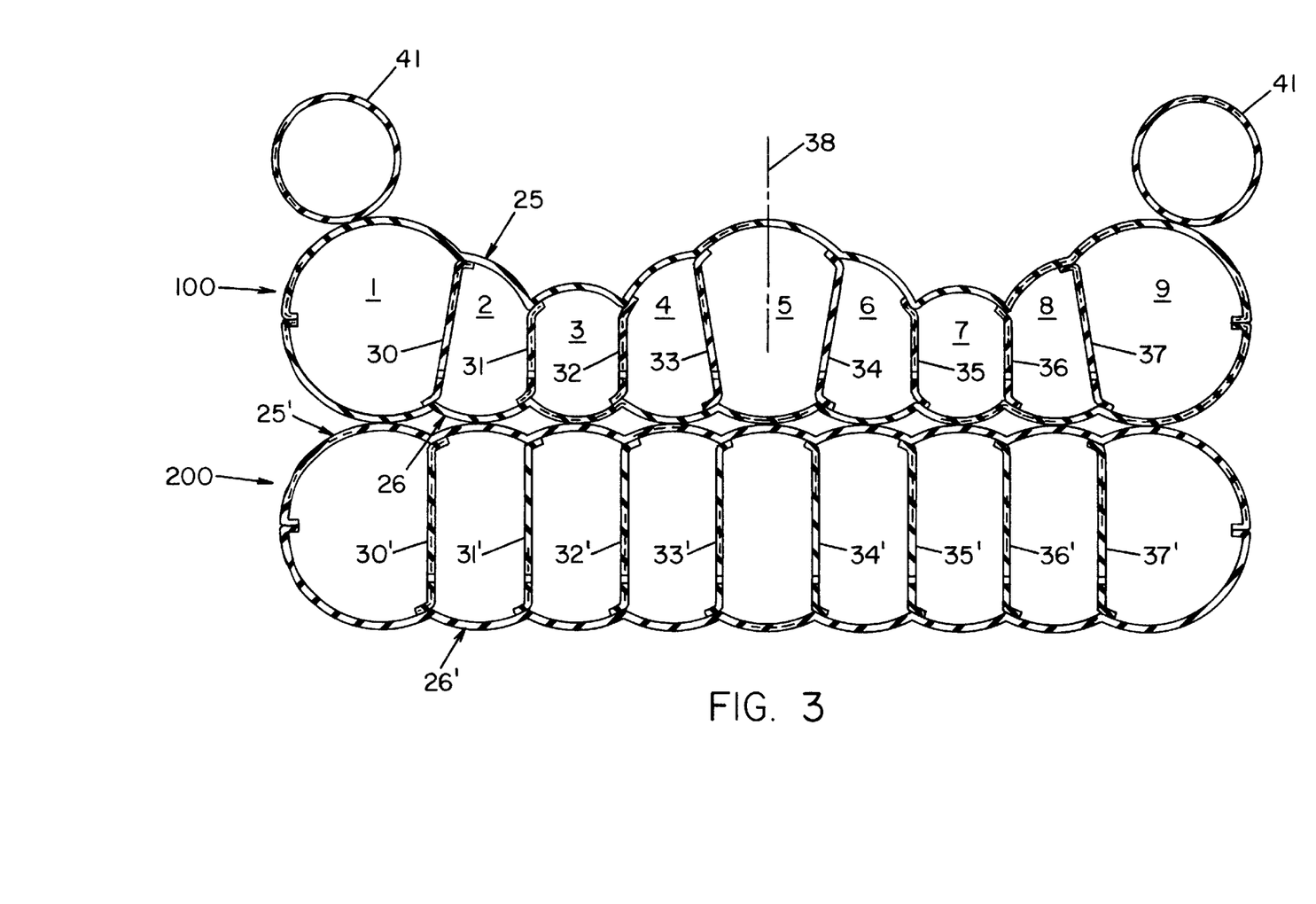
FIG. 3 is a cross sectional view of the inflatable escape slide of FIG. 2 taken on line 3—3 of FIG. 2.

The escape slide 10 has an upper longitudinally extending panel or panel member 25 and a lower longitudinally extending panel or panel member 26 that are suitably connected at their respective sides in a manner to be described. Slide 10 also includes a plurality of longitudinally extending flexible partitions or bulkheads 30, 31, 32, 33, 34, 35, 36 and 37 that extend along the inside thereof and are suitably adhered along their respective running edges to the upper panel member 25 and the lower panel member 26. The respective bulkheads 30 and 37 are slanted inwardly and upwardly relative to a longitudinal center line of the escape slide which center line is designated 38 in FIG. 4. The respective partitions 33 and 34 are slanted outwardly and upwardly relative to the center line 38. The remaining bulkheads extend in a general vertical direction. By thus slanting the bulkheads 30, 37, 33 and 34 in the manner described, the load forces imparted by the passengers on the upper panel 25 distributes the forces with less distortion of the tubes or chambers as formed by the bulkheads. The chambers formed by the use of the partitions 30 through 37 with the upper panel 25 and the lower panel 26 are all in communication with each other to facilitate the inflation of all the chambers.

The upper panel 25 and the lower panel 26 cooperate with the bulkheads 30 through 37 to create a series of longitudinally extending chambers which are in suitable communication with each other. The chambers are indicated as 1, through 9. The center chamber 5 is fabricated to have a higher crown to thereby provide a raised portion to separate the sliding surface of the upper panel 25 into two sliding pathways.

Figure 4:
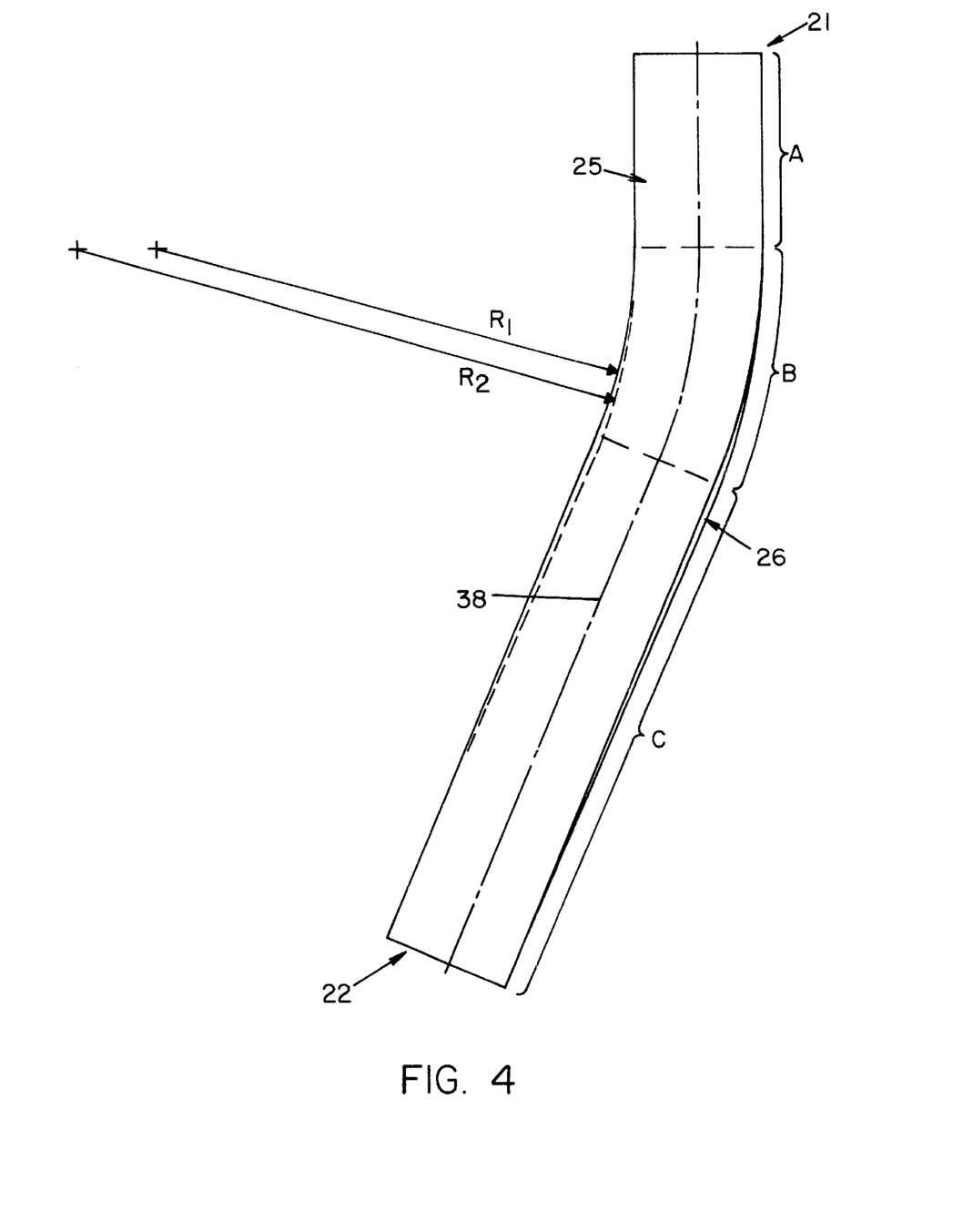
FIG. 4 is a diagrammatic plan view of the upper and lower panels of the escape slide prior to the panels being joined.
Figure 5:
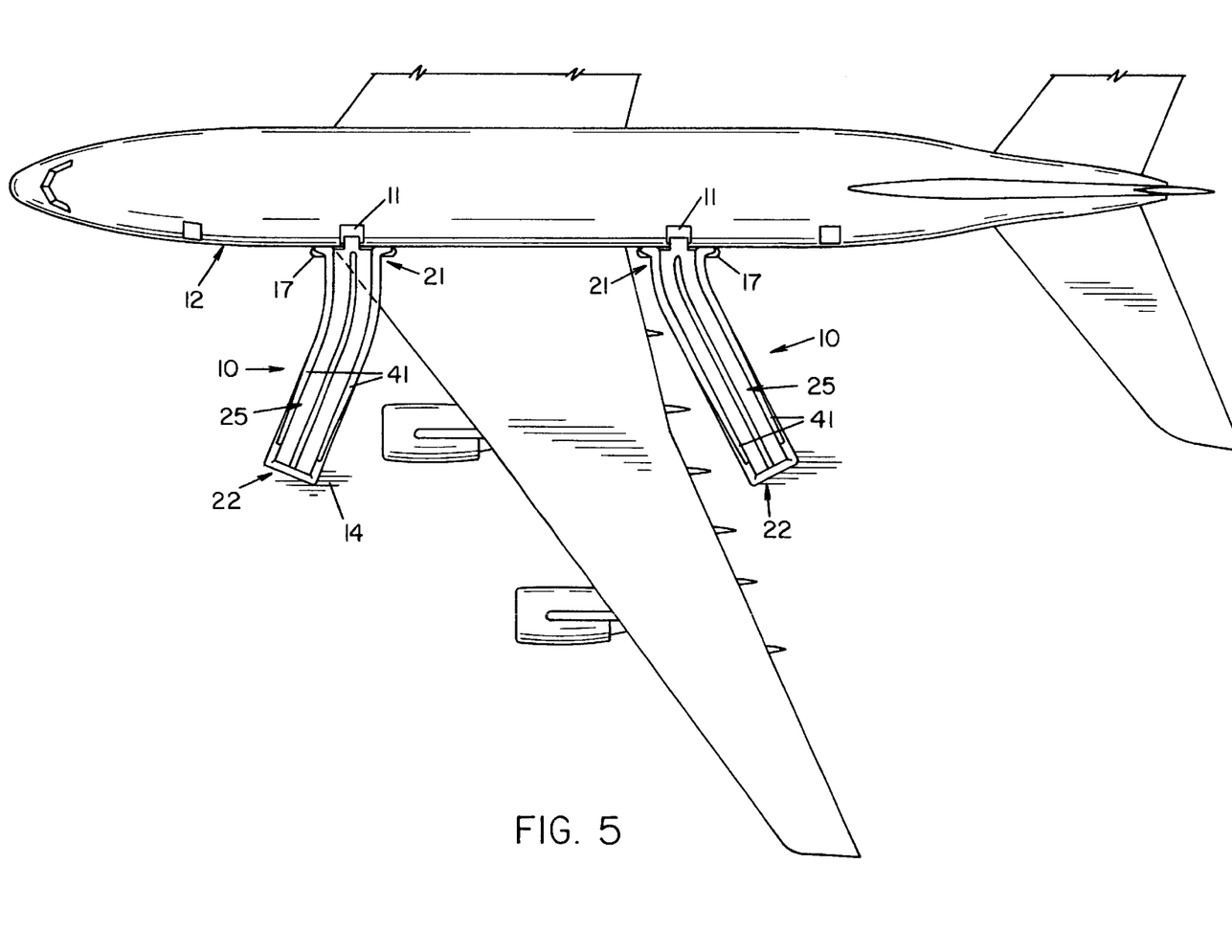
FIG. 5 is a fragmentary diagrammatic plan view of an aircraft with deployed escape slides showing the curvilinear portion close to the egress door of an aircraft.
Figure 6:
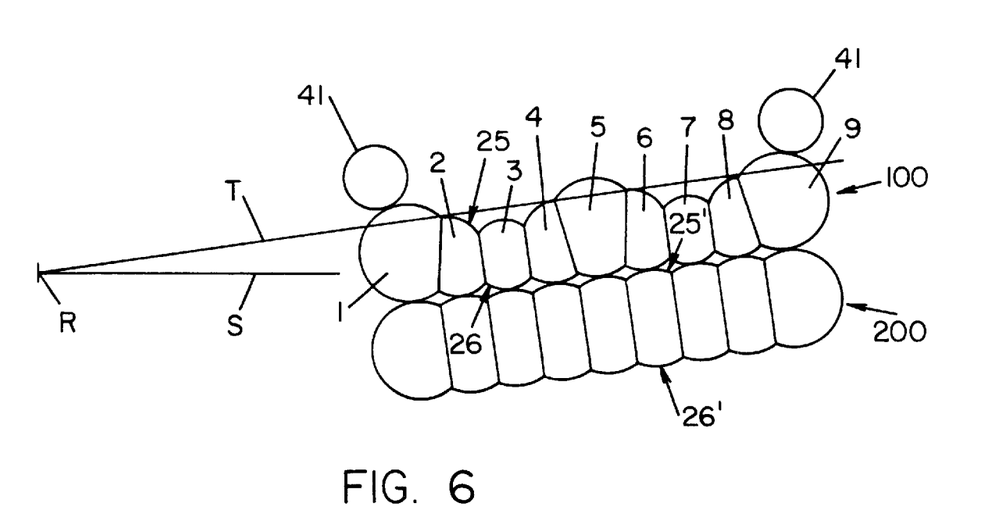
FIG. 6 is a fragmentary diagrammatic cross sectional view of the escape slide along a curvilinear portion illustrating the skew relationship of the sliding surface from the outer periphery to the inner periphery.

The upper panel 25 is composed of three panel sections (as shown in FIG. 4) A, B and C respectively. As seen in plan view sections A and C are linear in plan view whereas section B is curvilinear. Section A may be much shorter in length than section C, thus placing the curvilinear section B close to the egress door 11 of the aircraft as shown in FIG. 5. Prior to the joining of the upper panel section B to the lower panel section B, FIG. 4 shows the upper panel's edge section as having an inner peripheral radius of curvature of R-1 whereas the lower panel's edge section B as having an inner peripheral radius of curvature of R-2 wherein R-2 is greater than R-1. The width of these panels 25 and 26 are equal and it should be noted that the outer peripheral edges or margins of the respective panels are similarity curved with panel 25's edge having a shorter radius of curvature than panel 26 at these same areas. These sections when secured together at their side edges will skew the curvilinear portion to thereby raise the outer periphery of the curvilinear portion or section relative to the inner periphery portion or section. This feature is depicted in FIG. 6 wherein a line T makes an acute angle with a line S where line T represent a line that abuts the top surface of the top panel (excluding the center larger chamber 5) while line S represents a line parallel to the ground surface that intersects the line T at an apex R. Another way of stating this relationship is that a plane perpendicular to the ground and passing through the curvilinear portion of the escape slide would intersect the sliding surface of such slide along the upper panel 25 along a line which could be the mean line of the upper panel that makes an acute angle with a line that is parallel to a horizontally extending ground surface and also intersects the extension of the mean line of the upper panel curvilinear section. Mean line is used herein as the average value between the highest and lowest points of the crowns of the upper panel excluding the center raised crown and is shown as a straight line. Accordingly the surface or the sliding surface of the escape slide at the curvilinear portion is skewed inwardly considering the outer periphery to the inner periphery of this section, which is along section B of the upper panel 25. This skewing can also be achieved by other means as by making panel 26 of greater width at the curvature.

The above described structure of the upper panel 25, lower panel 26 and the bulkheads 30 through 37 form an elongated or longitudinally extending upper flexible septum chamber which in FIG. 3 is designated by the numeral 100. Substantially coextensive in length with the upper septum structure or chamber is an elongated or longitudinally extending lower flexible septum structure or septum chamber 200 which septum chamber 200 is substantially identical in construction to the upper septum chamber 100. Lower septum structure 200 has its own upper panel 25', and lower panel 26' along with its own bulkheads 30', 31', 32', 33', 34', 35', 36' and 37' thus providing a plurality of tubular members.

Inflatable guide rail bumpers or tubes 41 are suitably bonded at the upper respective margins of the escape slide as shown in FIGS. 1, 2, 3 and 5.

In the operation as a deployed slide the upper panel 25 in its undulating upper surface of valleys and crown portions provides an unusual advantage particularly considering its use on larger aircraft. Historically wet sliding conditions have presented significant problems in design as evacuees would have a strong tendency to hydroplane. In longer slides of the conventional smooth surface type, which are employed at higher sill heights, the evacuees will gain excessive speeds due to hydroplaning and will exit the slide beyond reasonable exit velocities. The channeling of water flow into the valleys of the undulating upper panel 25 will leave the crown or contact portion that is clear of water thereby assuring the evacuees an exit of reasonable speeds even under the most adverse conditions. A particular advantage of using an upper septum chamber 100 and a lower septum chamber 200 is that such structures improve bending resistance characteristics over conventional stacked "round" tubes structures with their trusses. The septum structure minimizes lateral deflection of the escape slide under strong wind conditions while maximizing the overall beam strength for use in large scale aircraft. A further advantage of using the double stacked septum chamber structure is that when used as a slide raft in the ditching mode, the increased size and volume of the lower septum chamber results in a higher raft above the critical water level in high waters with loaded passengers since there is a lower displacement depth in the water (because the lower septum chamber is pressurized and makes the upper septum chamber side higher in the water).

Various modifications are contemplated and may obviously be resorted to by those skilled in the art without departing from the described invention, as hereinafter defined by the appended claims.

We claim:

1. An aircraft life raft assembly for use from an elevated egress opening of an aircraft comprising a longitudinally extending inflatable escape slide said escape slide having a pair of longitudinally spaced linear sections and an intermediate section, said slide having a longitudinally extending center line, said slide having a head end and a toe end, said head end being located adjacent an egress opening of an aircraft, said toe end upon deployment of said slide being located adjacent a horizontally extending ground plane at an elevation below that of the egress opening, flexible material secured to said escape slide having an upper surface extending in said longitudinal direction defining a slide surface when said escape slide is inflated, pressurizing means operative upon actuation to inflate said escape slide, said intermediate section located along the length of said escape slide between said longitudinally spaced linear sections, said intermediate portion of said escape slide being curvilinear in plan view, a plane normal to said center line on said curvilinear section intersects said slide surface to define a first line that makes an acute angle with said horizonitally extending ground plane, said flexible material that forms said escape slide includes an upper longitudinally extending panel and a lower longitudinally extending panel that are secured together along their peripheries to form a first chamber, said first chamber having a plurality of longitudinally extending bulkheads that are laterally spaced, said bulkheads having upper and lower running edges that are secured to said upper and said lower panels to define longitudinally extending chambers, said upper panel and said lower panel and said bullheads define an upper septum chamber, said escape slide having an inflatable guide bumper secured to the respective outer margins, thereof, and wherein said bulkheads that form the outermost chambers with adjacent inward chambers are slanted inwardly and upwardly relative to said longitudinal center line.

2. An aircraft life raft assembly as set forth in claim 1 wherein said escape slide has a lower septum chamber located below said upper septum chamber and is coextensive therewith to reinforce said escape slide against deflection.

3. An aircraft life raft assembly as set forth in claim 2 wherein said bulkheads that form said chambers define a centermost chamber whose crown is raised to divide said upper panel into two separate sliding surfaces.

4. An aircraft life raft assembly as set forth in claim 3 wherein said bulkheads that form the innermost chambers adjacent to said centermost chamber are slanted outwardly and upwardly relative to said center line.

5. An aircraft life raft assembly for use from an elevated egress opening of an aircraft comprising a longitudinally extending inflatable escape slide said escape slide having a pair of longitudinally spaced linear sections and an intermediate section, said slide having a longitudinally extending center line, said slide having a head end and a toe end, said head end being located adjacent an egress opening of an aircraft, said toe end upon deployment of said slide being located adjacent a horizontally extending ground plane at an elevation below that of the egress opening, flexible material secured to said escape slide having an upper surface extending in said longitudinal direction defining a slide surface when said escape slide is inflated, pressurizing means operative upon actuation to inflate said escape slide, said intermediate section located along the length of said escape slide between said longitudinally spaced linear sections, said intermediate portion of said escape slide being curvilinear in plan view, and wherein said intermediate curvilinear section of said escape slide has an outer peripheral curved marginal edge and an inner peripheral curved marginal edge, and a line that is normal to said center line and that extends along said slide surface of a said upper surface is skewed in the direction of said inner peripheral curved marginal edge.

6. An aircraft life raft assembly as set forth in claim 5 wherein said flexible material for said escape slide has a cross sectional upper sliding surface as an undulating surface of valleys and crowns to facilitate the flow of water therefrom.

7. An aircraft life raft assembly as set forth in claim 6 wherein said escape slide has an upper septum chamber and a lower septum chamber, and said lower septum chamber is coextensive with said upper septum chamber.

8. An aircraft life raft assembly for use from an elevated egress opening of an aircraft comprising a longitudinally extending inflatable escape slide said escape slide having a pair of longitudinally spaced linear sections and an intermediate section, said slide having a longitudinally extending center line, said slide having a head end and a toe end, said head end being located adjacent an egress opening of an aircraft, said toe end upon deployment of said slide being located adjacent a horizontally extending ground plane at an elevation below that of the egress opening, flexible material secured to said escape slide having an upper surface extending in said longitudinal direction defining a slide surface when said escape slide is inflated, pressurizing means operative upon actuation to inflate said escape slide, said intermediate section located along the length of said escape slide between said longitudinally spaced linear sections, said intermediate portion of said escape slide being curvilinear in plan view, for use from an elevated egress opening of an aircraft comprising said curvilinear section of said escape slide has an outer peripheral curved marginal edge and an inner peripheral curved marginal edge, a line that is normal to said center line and that extends along said slide surface of said upper surface is skewed in the direction of said inner peripheral curved marginal edge, said flexible material for said escape slide has a cross sectional upper sliding surface as an undulating surface of valleys and crowns to facilitate the flow of water therefrom, said escape slide has an upper septum chamber and a lower septum chamber, said lower septum chamber is coextensive with said upper septum chamber, partitions divide said septum chambers into a plurality of longitudinally extending chambers, and the outermost ones of said partitions are slanted upwardly and inwardly.

9. An aircraft life raft assembly as set forth in claim 8 wherein the innermost pair of partitions that form the center chamber slant outwardly and upwardly.

10. An aircraft life raft assembly as set forth in claim 9 wherein said crown of said center chamber is substantially raised to divide said slide surface into two separate sliding surfaces.

11. An inflatable life raft escape slide for the evacuation and use from an elevated structure comprising a flexible distensible longitudinally extending escape slide, said slide having a longitudinally extending center line, said structure have an opening, said slide having a head end being located adjacent said opening, said slide having a toe end operative upon inflation of said escape slide to be located adjacent to a generally horizontally extending plane at an elevation below that of said opening, said escape slide has inflatable guide rails along the side edges of said escape slide, pressurizing means operative upon actuation to pressurize said escape slide and said guide rails, said escape slide having an upper slide surface for the evacuation of personnel thereon from said head end, said escape slide having a portion of its length curvilinear in plan view, said upper slide surface has a plurality of laterally spaced valleys and crowns that are operative in directing water in a downward direction and away from said slide surface, said escape slide has the respective side margins of said slide surface to define a first marginal edge and a second laterally spaced marginal edge in plan view, one of said marginal edges is higher than the other marginal edge along said curvilinear portion where a plane normal to said center line intersects said marginal edges, said escape slide has an upper panel and a lower panel that are joined together to define a first chamber, said first chamber having a plurality of longitudinally extending laterally spaced bulkheads, each of said bulkheads having an upper running edge and a lower running edge, said upper edges are secured to said upper panel, said lower edges are secured to said lower panel to define a plurality of chambers, passageways mean interconnecting said chambers, said panels and said bulkheads define a first septum chamber, said bulkheads that form the outermost chambers with adjacent inward chambers are slanted inwardly and upwardly as viewed in cross section of said escape slide to reinforce said escape slide against deflection at points of loading by evacuees descending down said escape slide.

12. An inflatable life raft escape slide as set forth in 11 claim wherein said escape slide has a lower septum chamber located below said upper septum chamber and is coextensive therewith to provide reinforcement.

13. An inflatable life raft escape slide as set forth in claim 12 wherein said bulkheads of said upper septum chamber are cooperative to define a centermost chamber, and the crown of said centermost chamber is higher in cross section than the crowns of all adjacent chambers to form two separate longitudinally extending sliding surfaces.

14. An inflatable life raft escape slide as set forth in claim 13 wherein said bulkheads that form said centermost chamber are slanted upwardly and outwardly relative to said center line.

15. An inflatable aircraft life raft escape slide assembly for use in the evacuation of passengers from an aircraft comprising: a flexible distensible longitudinally extending escape slide having a pair of longitudinally spaced linear sections interconnected by an intermediate curvilinear section, said escape slide having a longitudinally extending center line, said escape slide having a head end adjacent an egress openings of the aircraft, said escape slide having a toe end that is operative upon inflation of said escape slide to be located at a horizontally extending plane on the ground, pressurizing means operative upon an upper septum chamber and a lower septum chamber that is coextensive with said upper chamber for the full length of the said escape slide, wherein said escape slide has a portion of said curvilinear length skewed to bank passengers in their descent from said head end of said slide.

16. An inflatable aircraft life raft escape slide assembly as set forth in claim 15 herein said curvilinear section is closely adjacent to said toe end.

17. An inflatable aircraft life raft escape slide as set forth in claim 15 wherein one of said linear sections is of greater length than the remaining one of said linear sections.

18. An inflatable aircraft life raft escape slide as set forth in claim 17 wherein said center line of said curvilinear section makes a turn less than 90 degrees.

19. An inflatable aircraft life raft escape slide as set forth in claim 17 wherein said center line makes a turn of 90° or more.

* * * * *